Feb. 16, 1971  AKIRA HIGASHI ET AL  3,564,488
SPEED MEASURING DEVICE OF MOVING OBJECTS
Filed June 16, 1969
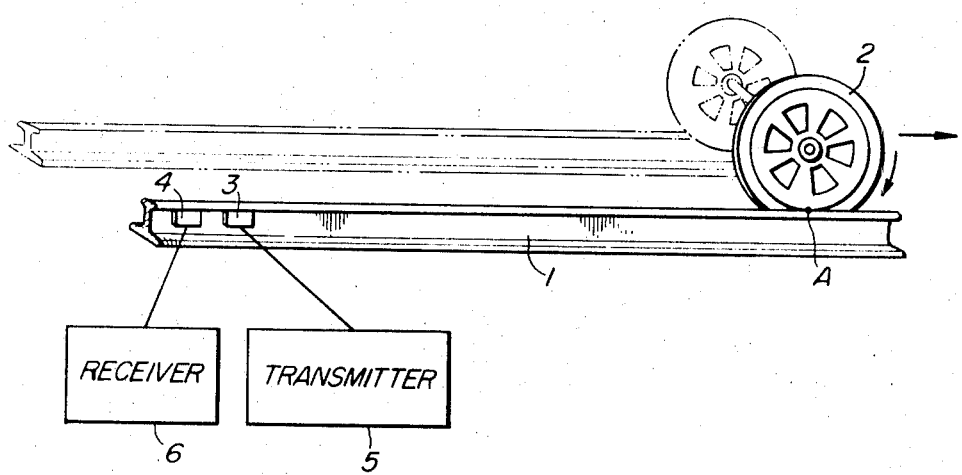
INVENTORS
AKIRA HIGASHI, MASAO TSUBOI,
KAKUTARO WADA, TARO ANZAI and
TORAO SUZUKI
BY
Craig, Antonelli, Stewart & Hill
ATTORNEYS

United States Patent Office 3,564,488
Patented Feb. 16, 1971

3,564,488
SPEED MEASURING DEVICE OF MOVING OBJECTS
Akira Higashi, Musashino-shi, Masao Tsuboi and Kakutaro Wada, Koganei-shi, Taro Anzai, Fujisawa-shi, and Torao Suzuki, Yokohama, Japan, assignors to Hitachi, Ltd., and Japanese National Railways, both of Tokyo, Japan, both Japanese corporations
Filed June 16, 1969, Ser. No. 833,350
Int. Cl. G01s 9/66
U.S. Cl. 340—1                                1 Claim

ABSTRACT OF THE DISCLOSURE

A speed measuring device of moving objects, in particular a device for measuring the speed of a moving body running on rails in which ultrasonic waves are sent out to at least one of the rails through a piezoelectrical transducer element to detect the Doppler frequency contained in the reflected wave from the neighborhood of the contact point between the wheel of the moving body and the rail for speed measurement.

BACKGROUND OF THE INVENTION

Field of the invention

The present invention relates to a device for measuring the speed of a moving body such as a train running on rails, which utilizes ultrasonic waves propagated over a rail.

Description of the prior art

In the past, there have been various systems for the measurement of the speed of a train. They include the discontinuous measuring system in which a plurality of train detectors (for example, electromagnetic-type ground means) are disposed along the tracks so that the speed of a train is measured by the time interval required for the train to pass from one detector to another, and the continuous measuring systems, such as a microwave Doppler radar system by which microwaves are sent out to a train and the measurement of the speed of a train is made on the basis of the Doppler frequency contained in the reflected wave, a microwave FM/CW system and a Doppler radar system employing the radiation of ultrasonic waves. These systems are more or less disadvantageous in some applications from the aspects of their measurement accuracy, loss of data by the standing wave, error in measurements due to the direction and velocity of the wind, etc.

SUMMARY OF THE INVENTION

To eliminate such drawbacks, the present invention has for object the provision of a device by which ultrasonic waves are sent out to at least one of the rails and the speed of a moving body is measured on the basis of the Doppler frequency contained in the reflected wave from the neighborhood of the contact point between the wheel of the moving body and the rail to thereby permit highly accurate measurement of the speed of moving objects, such as a train within a relatively short distance and without any loss of data.

BRIEF DESCRIPTION OF THE DRAWING

The accompanying drawing is a perspective view for explaining the device according to the present invention.

DESCRIPTION OF THE PREFERRED EMBODIMENT

Referring to the drawing, reference numeral 1 designates a rail; 2 a wheel of a moving body; 3, 4 electrical-mechanical vibration converter elements adapted to convert electrical oscillations into mechanical vibrations, or vice versa; 5 a transmitter; 6 a receiver.

In operation, the transmitter 5 generates electrical oscillations whose frequency range is between 20 kc. to 1 mc. and these electrical oscillations are converted into equivalent mechanical vibrations by the electrical-mechanical vibration converter element 3. The converted mechanical vibrations are propagated in the rail 1 in the form of vibratory waves. When the weight of the moving body acts in such a manner as to lock the rail 1 in the vicinity of point A where the wheel 2 and the rail contact, the acoustic impedance at this point is increased and thus a part of the travelling vibratory wave is reflected and propagated back through the rail 1 to the electrical-mechanical vibration converter element 4. The element 4 converts this reflected vibratory wave into an equivalent electrical oscillation which is in turn received by the receiver 6. Assuming that the body 1 including the wheel 2 is in motion, the reflected wave is received which has a frequency of $f_0 \pm fD$, with the Doppler frequency $fD$ being given as follows:

$$fD = \frac{2V \cos\theta}{C} \cdot f_0$$

where $f_0$ is the transmitted frequency; C the propagation velocity of an ultrasonic wave through the rail; V the speed at which the moving body moves, $\theta$ is the angle between the direction in which the moving body is moving and the propaagtion direction of the ultrasonic wave, which may be taken here as $\theta=0$, that is, $\cos \theta = 1$.

If the material of the rails is iron, the value C for the propagation velocity of the ultrasonic wave in the rail is given Longitudinal wave $C \doteq 5200$ m./s.
Traverse waves     $C \doteq 3200$ m./s.

Experiments have shown that the reflection of a point of discontinuity under the weight of a wheel is most prominent when a traverse wave in the frequency range of 20 kc. to 100 kc. is used. For example, if $f_0 = 50$ kc. and the speed of the moving body $= 10$/m./s., $$fD = 310 \text{ c./s.}$$

and thus satisfactory detection of the speed of the moving body is possible. In this way, the receiver 6 detects the Doppler frequency $fD$ from the received frequency and calculates the speed.

In actual practice, the results will be apparent in the light of the intended purposes of the present invention if any system of transmitted and received waves, such as a continuous wave (CW) system, FM/CW system or a pulsed system is employed. In short, the essence of the present invention resides in the sending out of ultrasonic waves to a rail and ensures stable and accurate measurement of the speed.

From the foregoing description it will be seen that the device according to the present invention is so designed that ultrasonic waves are sent out to a rail on which a moving body is travelling and the speed thereof is measured on the basis of the Doppler frequency contained in the reflected wave from the neighbourhood of the contact point between the wheel of the moving body and the rail. Thus the present invention has the effect that measurements which are both extremely accurate and involving no loss of data can be effected with a simple device.

We claim:
1. A speed measuring device of moving objects characterized in that the speed of a moving object running on rails is measured by sending out ultrasonic waves to at least one of the rails such that the speed of the moving body is measured on the basis of the Doppler frequency contained in the reflected wave from the neighborhood of the contact point between the wheel of the moving object and the rail, said device comprising: means for propagating an ultrasonic wave in a given direction along said one rail; means for detecting a wave reflected from said contact point; said detection means including means for measuring the Doppler frequency of said reflected wave.

References Cited

UNITED STATES PATENTS 3,163,843  12/1964  Dieckamp.
3,233,212  2/1966  Aver, Jr., et al.

JAMES J. GILL, Primary Examiner

H. GOLDSTEIN, Assistant Examiner

U.S. Cl. X.R.

73—67.7, 488